US012013161B2

United States Patent
Longenecker

(10) Patent No.: US 12,013,161 B2
(45) Date of Patent: Jun. 18, 2024

(54) METHOD OF OPERATING AN ELECTRONIC EXPANSION VALVE IN AN AIR CONDITIONER UNIT

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 138 days.

(21) Appl. No.: 17/539,342

(22) Filed: Dec. 1, 2021

(65) Prior Publication Data

US 2023/0168015 A1 Jun. 1, 2023

(51) Int. Cl.
*F25B 49/02* (2006.01)
*F25B 41/34* (2021.01)

(52) U.S. Cl.
CPC .............. *F25B 49/02* (2013.01); *F25B 41/34* (2021.01); *F25B 2341/064* (2013.01); *F25B 2600/2513* (2013.01); *F25B 2700/171* (2013.01); *F25B 2700/2104* (2013.01); *F25B 2700/2106* (2013.01)

(58) Field of Classification Search
CPC ........ F25B 2341/064; F25B 2600/2513; F25B 2700/171; F25B 2700/2104; F25B 2700/2106; F25B 41/34; F25B 49/02
See application file for complete search history.

(56) References Cited

U.S. PATENT DOCUMENTS

| | | | |
|---|---|---|---|
| 5,533,347 A | 7/1996 | Ott | |
| 7,076,962 B2 | 7/2006 | He | |
| 7,784,296 B2 | 8/2010 | Chen | |
| 8,151,583 B2 | 4/2012 | Douglas | |
| 9,599,384 B2 * | 3/2017 | Weyna | F25B 49/027 |
| 10,174,977 B2 | 1/2019 | Lin | |
| 10,254,026 B2 | 4/2019 | Patel | |
| 10,486,499 B2 | 11/2019 | Stanke | |
| 10,612,826 B2 | 4/2020 | Hern | |

(Continued)

FOREIGN PATENT DOCUMENTS

| | | |
|---|---|---|
| CN | 103836861 A | 6/2014 |
| CN | 105667250 B | 4/2018 |

(Continued)

*Primary Examiner* — Henry T Crenshaw
(74) *Attorney, Agent, or Firm* — Dority & Manning, P.A.

(57) ABSTRACT

An air conditioner unit and method of operating the same includes performing an operating cycle in a feedback control mode, including adjusting the an electronic expansion valve (EEV) to minimize an error between a measured superheat and a target superheat using a PI controller, determining that a target compressor speed has changed by greater than a predetermined speed threshold, and initiating a linear control mode of the operating cycle, including adjusting the EEV using a valve position equation that is a function of the target compressor speed, an indoor temperature, and an outdoor temperature. The controller may also start a transition timer upon initiation of the linear control mode, transition back into a feedback control mode upon expiration of the transition timer, and initialize the integral term of the PI controller based on the EEV position from the linear control mode.

19 Claims, 8 Drawing Sheets

(56) References Cited

U.S. PATENT DOCUMENTS

| | | | |
|---|---|---|---|
| 10,704,814 B2 | 7/2020 | De | |
| 10,823,448 B2 | 11/2020 | Jiang | |
| 10,828,965 B2 | 11/2020 | Xu | |
| 2005/0126190 A1 | 6/2005 | Lifson | |
| 2013/0174591 A1 | 7/2013 | Das | |
| 2014/0137573 A1 | 5/2014 | Lin | |
| 2015/0052922 A1* | 2/2015 | Tanaka | F24F 11/30 62/210 |
| 2018/0209703 A1* | 7/2018 | Hern | F25B 49/02 |
| 2018/0313554 A1* | 11/2018 | Henderson | F24F 11/30 |
| 2019/0181477 A1* | 6/2019 | Farnsworth | H01M 8/24 |
| 2020/0158370 A1 | 5/2020 | Lu | |
| 2022/0170465 A1* | 6/2022 | Yang | F25B 43/02 |

FOREIGN PATENT DOCUMENTS

| | | |
|---|---|---|
| CN | 106196764 B | 5/2019 |
| CN | 106322640 B | 5/2019 |
| CN | 111076367 B | 11/2020 |
| JP | H01222164 A | 9/1989 |
| JP | 04203847 A * | 7/1992 |
| KR | 101372144 B1 | 3/2014 |
| KR | 20190101675 A | 9/2019 |
| WO | WO2020166273 A1 | 8/2020 |

\* cited by examiner

METHOD OF OPERATING AN ELECTRONIC EXPANSION VALVE IN AN AIR CONDITIONER UNIT

FIELD OF THE INVENTION

The present disclosure relates generally to air conditioner units, and more particularly to methods of operating electronic expansion valves in air conditioner units.

BACKGROUND OF THE INVENTION

Air conditioner or conditioning units are conventionally utilized to adjust the temperature indoors, e.g., within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected to another portion located outdoors, e.g., by tubing or conduit carrying refrigerant. These types of units are typically used for conditioning the air in larger spaces.

Another type of air conditioner unit, commonly referred to as single-package vertical units (SPVU) or package terminal air conditioners (PTAC), may be utilized to adjust the temperature in, for example, a single room or group of rooms of a structure. These units typically operate like split heat pump systems, except that the indoor and outdoor portions are defined by a bulkhead and all system components are housed within a single package that installed in a wall sleeve positioned within an opening of an exterior wall of a building.

When a conventional PTAC is operating in a cooling or heating mode, a compressor circulates refrigerant within a sealed system, while indoor and outdoor fans urge flows of air across indoor and outdoor heat exchangers respectively. For example, when running these air conditioner units to either heat or cool a room at various ambient conditions or compressor speeds, an expansion device (such as an electronic expansion valve or "EEV") is used to expand refrigerant and permit a phase change from liquid to vapor within the evaporator prior to passing the refrigerant back into the compressor.

Conventional air conditioner units control the electronic expansion valve to a fixed position, after which a proportional-integral ("PI") controller operates the EEV to adjust the superheat to a target value. Superheat control enables the sealed system to be optimized during stable operating conditions. However, sharp changes in the compressor operating speed may result in issues in implementing superheat control. For example, superheat control during quick compressor speed changes may generate diverging behavior until the compressor reaches the target compressor speed.

In addition, the response of the superheat control may lag significantly and a sharp change in EEV position can cause a "ripple" effect where a pressure/refrigerant change ripples through the system and creates an instability even minutes later. Moreover, if the integral term of the PI controller is initialized to the current position and the error is non-zero, the EEV position may sharply increase when the unit switches from the fixed position control to the PI control, and this increase can create an oscillation that is difficult to control. By contrast, if the integral term is initialized to 0, the EEV will close and create a sharp spike in system pressures which may cause the compressor to stall.

Accordingly, improved air conditioner units and methods of operation would be useful. More specifically, a heat pump air conditioner unit that regulates an electronic expansion valve for improved system performance and reliability, particularly during transient operation, would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method of operating an air conditioner unit is provided. The air conditioner unit includes a refrigeration loop including an indoor heat exchanger and an outdoor heat exchanger, a compressor operably coupled to the refrigeration loop and being configured to urge refrigerant through the refrigeration loop, and an electronic expansion valve fluidly coupled to the refrigeration loop. The method includes performing an operating cycle in a feedback control mode, the feedback control mode comprising adjusting the electronic expansion valve to minimize an error between a measured superheat and a target superheat, determining that a target compressor speed has changed by greater than a predetermined speed threshold, and initiating a linear control mode of the operating cycle, the linear control mode comprising adjusting the electronic expansion valve using a valve position equation that is a function of the target compressor speed, an indoor temperature, and an outdoor temperature.

In another exemplary embodiment, an air conditioner unit is provided including a refrigeration loop comprising an indoor heat exchanger and an outdoor heat exchanger, a compressor operably coupled to the refrigeration loop and being configured to urge refrigerant through the refrigeration loop, an electronic expansion valve fluidly coupled to the refrigeration loop, and a controller operably coupled to the compressor and the electronic expansion valve. The controller is configured to perform an operating cycle in a feedback control mode, the feedback control mode comprising adjusting the electronic expansion valve to minimize an error between a measured superheat and a target superheat, determine that a target compressor speed has changed by greater than a predetermined speed threshold, and initiate a linear control mode of the operating cycle, the linear control mode comprising adjusting the electronic expansion valve using a valve position equation that is a function of the target compressor speed, an indoor temperature, and an outdoor temperature.

In yet another exemplary embodiment, a method of operating an air conditioner unit is provided. The air conditioner unit includes a refrigeration loop including an indoor heat exchanger and an outdoor heat exchanger, a compressor operably coupled to the refrigeration loop and being configured to urge refrigerant through the refrigeration loop, and an electronic expansion valve fluidly coupled to the refrigeration loop. The method includes performing an operating cycle in a linear control mode, the linear control mode comprising adjusting the electronic expansion valve using a valve position equation that is a function of a target compressor speed, an indoor temperature, and an outdoor temperature, starting a transition timer upon initiation of the linear control mode, and transitioning into a feedback control mode upon expiration of the transition timer, the feedback control mode comprising adjusting the electronic expansion valve to minimize an error between a measured superheat and a target superheat.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
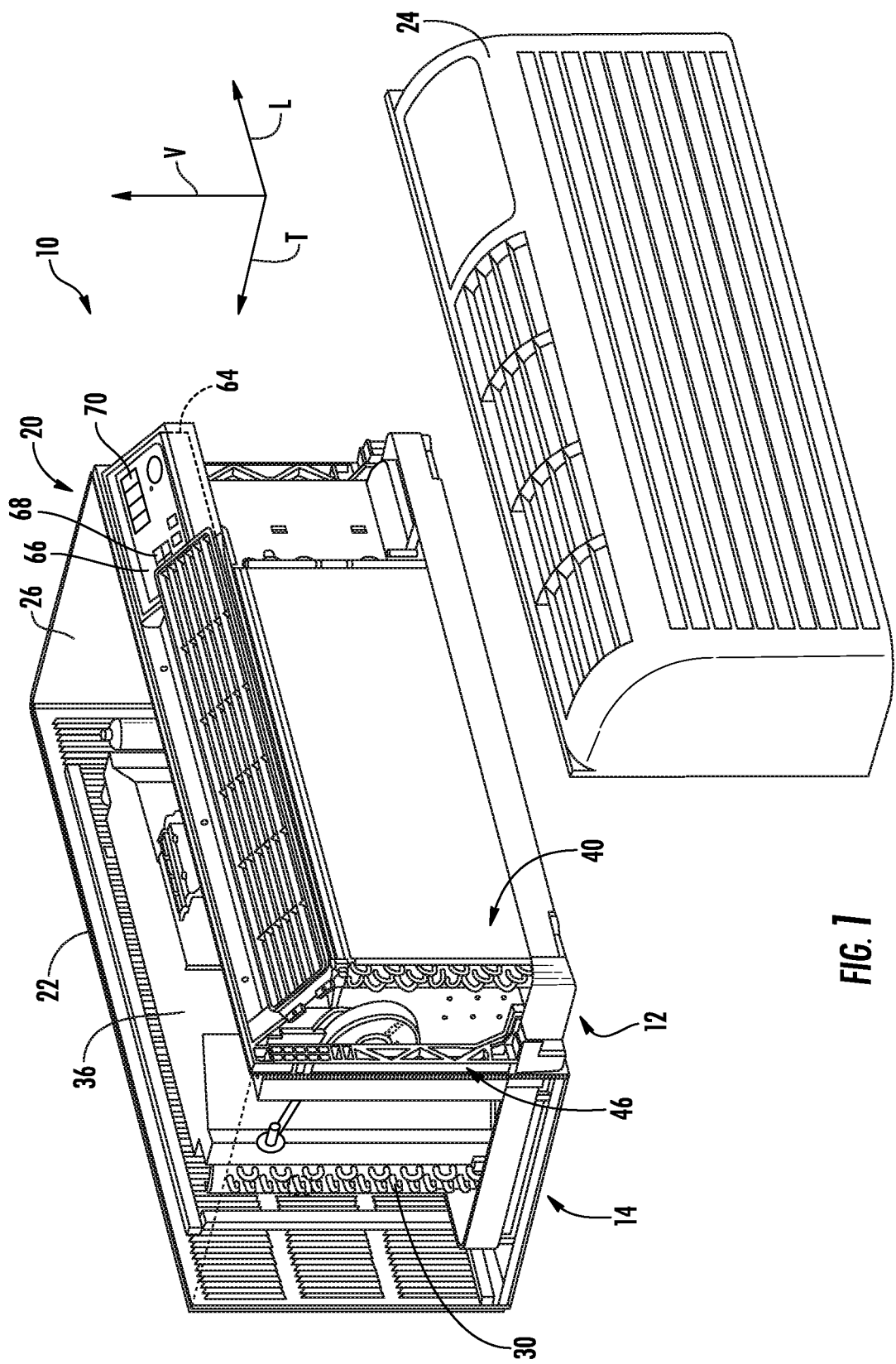
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
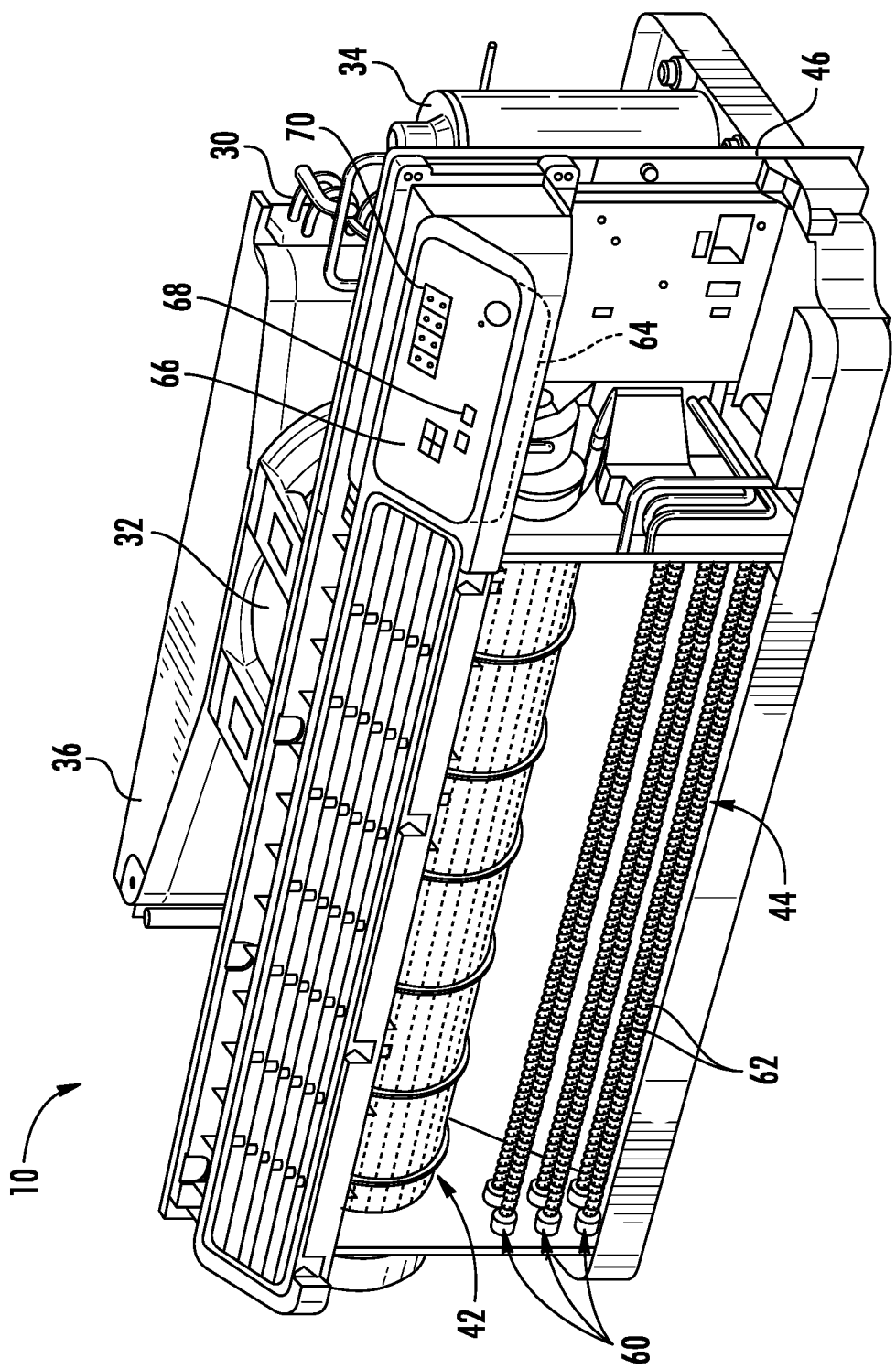
FIG. 2 is another perspective view of components of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined. Although aspects of the present subject matter are described with reference to PTAC unit 10, it should be appreciated that aspects of the present subject matter may be equally applicable to other air conditioner unit types and configurations, such as single package vertical units (SPVUs) and split heat pump systems.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
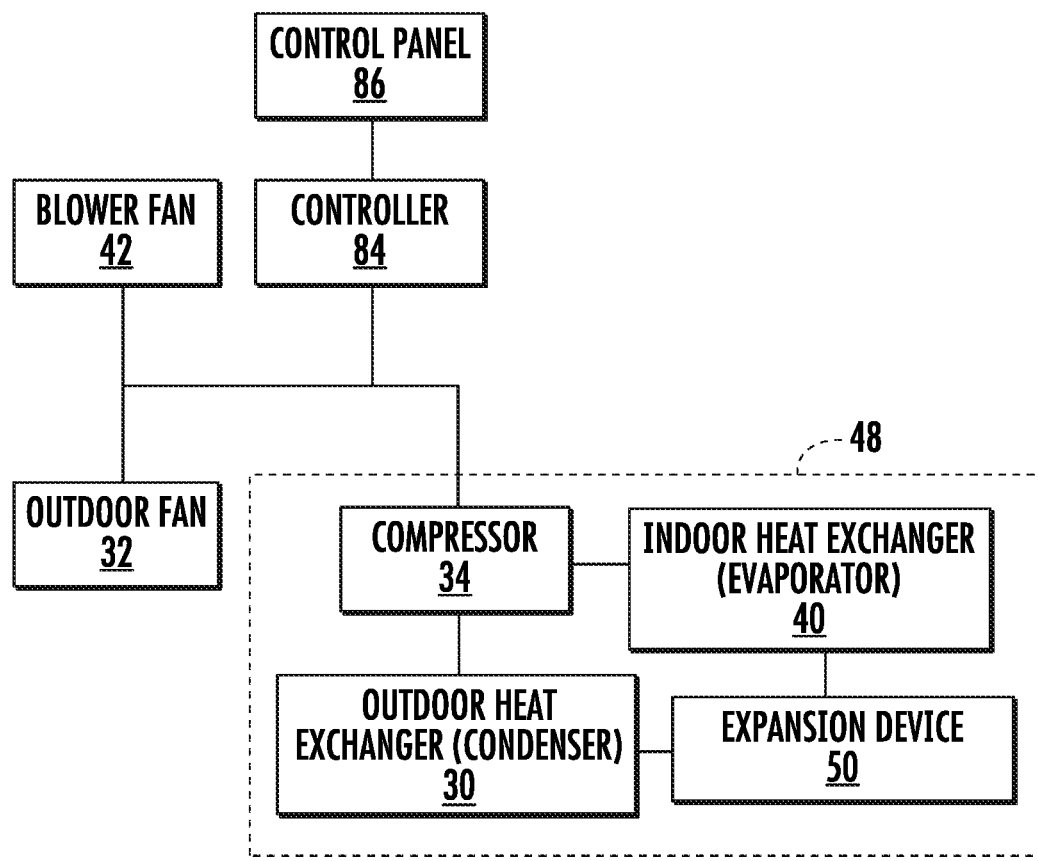
FIG. 3 is a schematic view of a refrigeration loop in accordance with one embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve ("EEV") that enables controlled expansion of refrigerant, as is known in the art. According to alternative embodiments, expansion device 50 may be a capillary tube or another suitable expansion device configured for use in a thermodynamic cycle.

More specifically, according to exemplary embodiments, electronic expansion device 50 may be configured to precisely control the expansion of refrigerant to maintain, for example, a desired temperature differential of the refrigerant across the evaporator (i.e., the outdoor heat exchanger 30 in heat pump mode). In other words, electronic expansion device 50 throttles the flow of refrigerant based on the reaction of the temperature differential across the evaporator or the amount of superheat temperature differential, thereby ensuring that the refrigerant is in the gaseous state entering compressor 34.

In general, the terms "superheat," "operating superheat," or the like are generally intended to refer to the temperature increase of the refrigerant past the fully saturated vapor temperature in the evaporator. In this regard, for example, the superheat may be quantified in degrees Fahrenheit, e.g., such that 1° F. superheat means that the refrigerant exiting the evaporator is 1° F. higher than the saturated vapor temperature. It should be appreciated that the operating superheat may be measured and monitored by controller 64 in any suitable manner. For example, controller 64 may be operably coupled to a pressure sensor for measuring the refrigerant pressure exiting the evaporator, may convert that pressure to the saturated vapor temperature, and may subtract that temperature from the measured refrigerant temperature at the evaporator outlet to determine superheat.

According to exemplary embodiments, expansion device or electronic expansion valve 50 may be driven by a stepper motor or other drive mechanism to any desirable position between a fully closed position (e.g., when no refrigerant passes through EEV 50) to a fully open position (e.g., when there is little or no restriction through the EEV 50). For example, controller 64 may be operably coupled to EEV 50 and may regulate the position of the EEV 50 through a control signal to achieve a target superheat, a target restriction/expansion, etc.

More specifically, the control signal communicated from controller 64 may specify the number of control steps (or simply "steps") and a corresponding direction (e.g., counterclockwise toward the closed position or clockwise toward the open position). Each EEV 50 may have a physical stroke span equal to the difference between the fully open position and the fully closed position. In addition, the EEV 50 may include a step range or range of control steps that correspond to the number adjustment steps it take for the EEV 50 to travel from the fully closed position to the fully open position.

Each "step" may refer to a predetermined rotation of the drive mechanism, e.g., such as a stepper motor, which may in turn move the EEV 50 a fixed linear distance toward the open or closed position (depending on the commanded step direction). For example, according to the exemplary embodiment, the EEV 50 may have a step range of 500 steps, with 0 steps corresponding to fully closed and 500 steps corresponding to fully open. However, it should be appreciated that according to alternative embodiments, any given electronic expansion valve may include a different number of control steps, and the absolute step adjustments described herein may be varied accordingly.

In addition, as used herein, the position of EEV 50 may be expressed as a percentage, e.g., where 0% corresponds to a fully closed position and 100% corresponds to a fully open position. According to exemplary embodiments, this percentage representation may also refer to the percentage of total control steps taken from the closed position, e.g., with 10% referring to 50 steps (e.g., 10% of the 500 total steps), 80% referring to 400 steps (e.g., 80% of 500 total steps), etc.

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans, e.g., similar to variable speed compressor 34. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66 and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
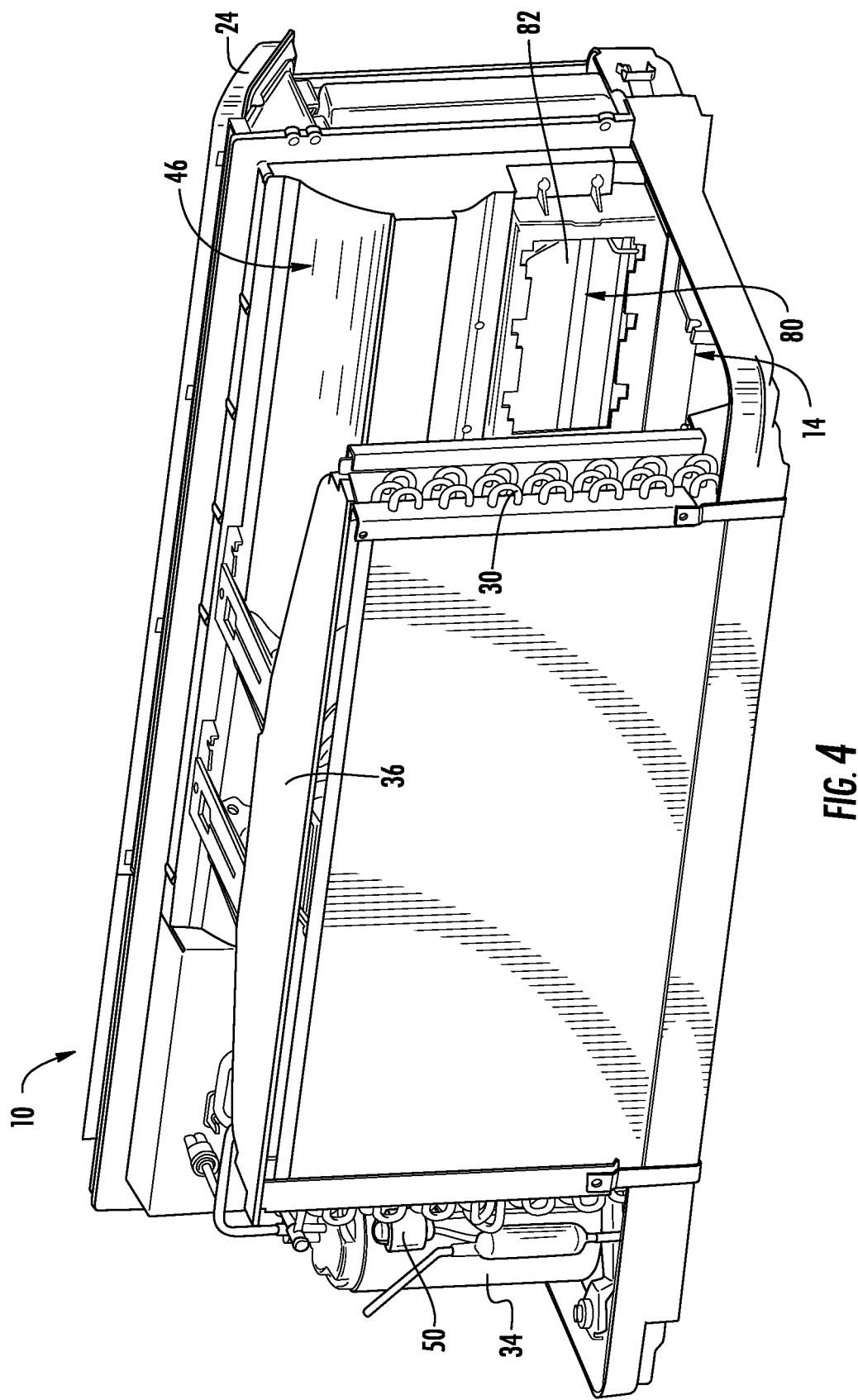
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 for providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, to compensate for negative pressure created within the room, etc. In this manner, according to an exemplary embodiment, make-up air may be provided into the room through vent aperture 80 when desired.

Figure 5:
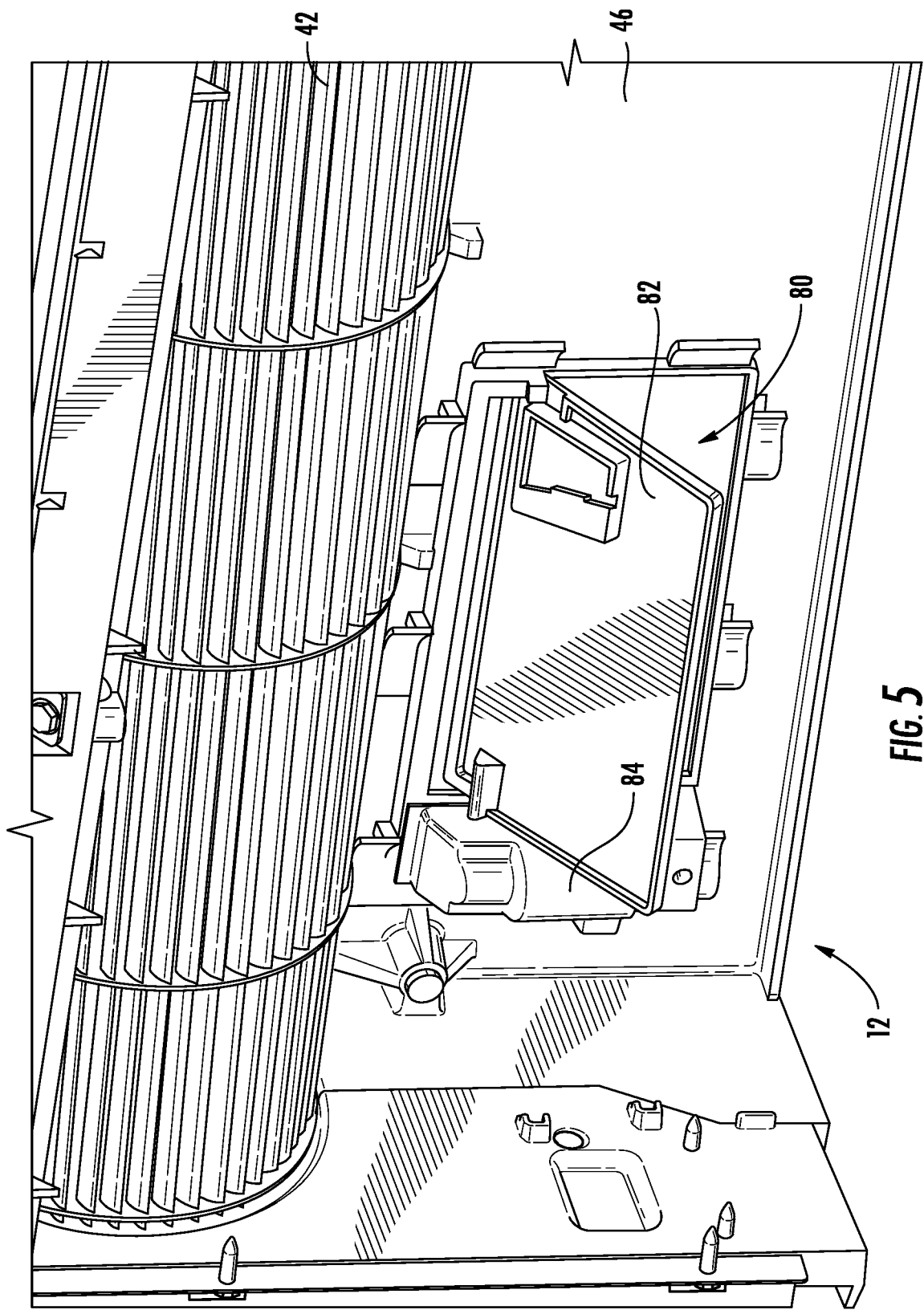
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, according to an exemplary embodiment of the present subject matter, unit 10 may further include an auxiliary sealed system that is positioned over vent aperture 80 for conditioning make-up air. The auxiliary sealed system may be a miniature sealed system that acts similar to refrigeration loop 48, but conditions only the air flowing through vent aperture 80. According to alternative embodiments, such as that described herein, make-up air may be urged through vent aperture 80 without the assistance of an auxiliary sealed system. Instead, make-up air is urged through vent aperture 80 may be conditioned at least in part by refrigeration loop 48, e.g., by passing through indoor heat exchanger 40. Additionally, the make-up air may be conditioned immediately upon entrance through vent aperture 80 or sequentially after combining with the air stream induced through indoor heat exchanger 40.

Figure 6:
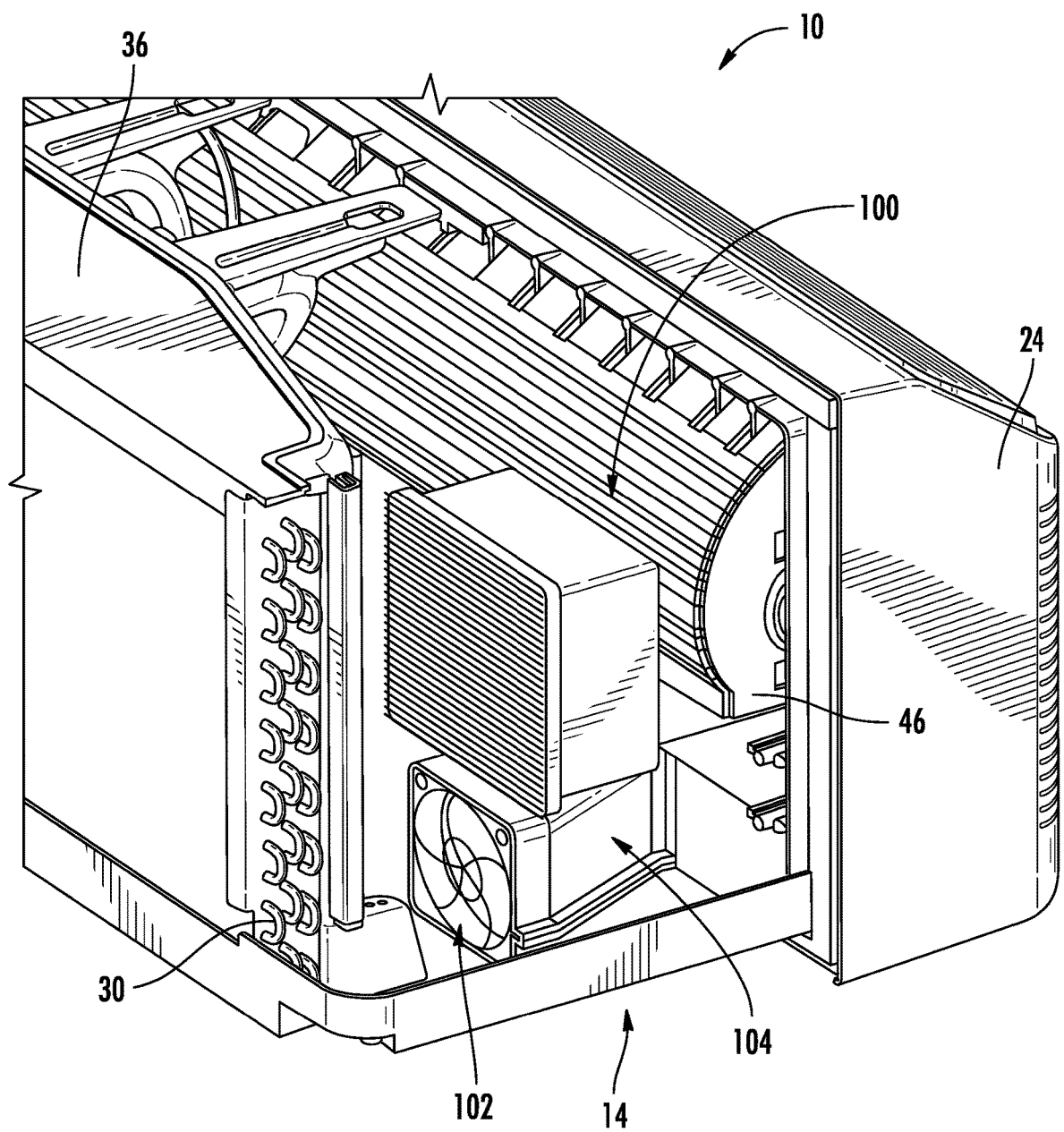
FIG. 6 is a rear perspective view of the exemplary air conditioner unit and bulkhead of FIG. 4 including a fan assembly for providing make-up air in accordance with one embodiment of the present disclosure.

Referring now to FIG. 6, a fan assembly 100 will be described according to an exemplary embodiment of the present subject matter. According to the illustrated embodiment, fan assembly 100 is generally configured for urging the flow of makeup air through vent aperture 80 and into a conditioned room without the assistance of an auxiliary sealed system. However, it should be appreciated that fan assembly 100 could be used in conjunction with a make-up air module including an auxiliary sealed system for conditioning the flow of make-up air. As illustrated, fan assembly 100 includes an auxiliary fan 102 for urging a flow of make-up air through a fan duct 104 and into indoor portion 12 through vent aperture 80.

According to the illustrated embodiment, auxiliary fan 102 is an axial fan positioned at an inlet of fan duct 104, e.g., upstream from vent aperture 80. However, it should be appreciated that any other suitable number, type, and configuration of fan or blower could be used to urge a flow of makeup air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
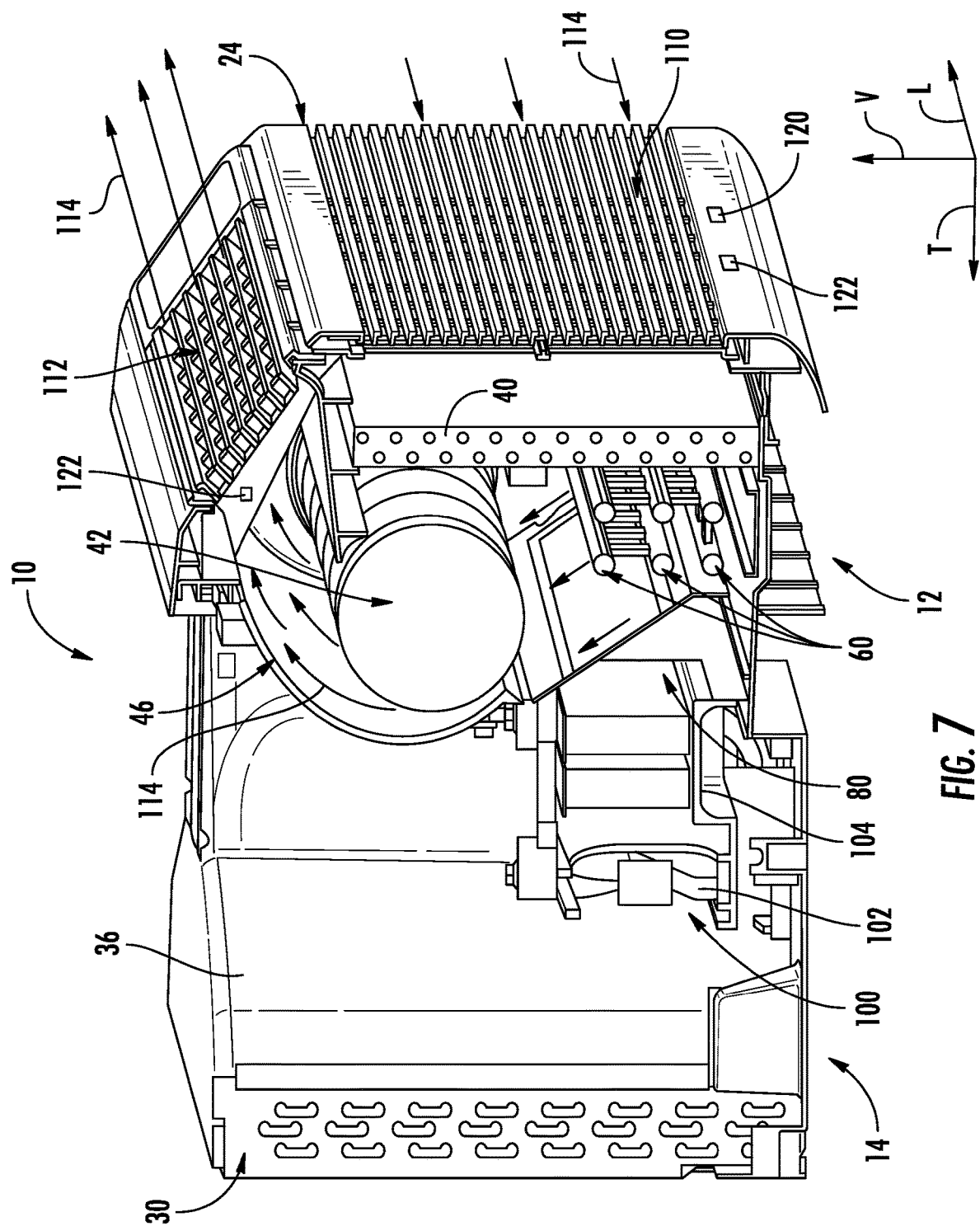
FIG. 7 is a side cross sectional view of the exemplary air conditioner unit of FIG. 1.

Referring now to FIG. 7, operation of unit 10 will be described according to an exemplary embodiment. More specifically, the operation of components within indoor portion 12 will be described during a cooling operation or cooling cycle of unit 10. To simplify discussion, the operation of auxiliary fan 102 for providing make-up air through vent aperture 80 will be omitted, e.g., as if vent door 82 were closed. Although a cooling cycle will be described, it should be further appreciated that indoor heat exchanger 40 and/or heating unit 44 be used to heat indoor air according to alternative embodiments. Moreover, although operation of unit 10 is described below for the exemplary packaged terminal air conditioner unit, it should be further appreciated that aspects the present subject matter may be used in any other suitable air conditioner unit, such as a heat pump or split unit system.

As illustrated, room front 24 of unit 10 generally defines an intake vent 110 and a discharge vent 112 for use in circulating a flow of air (indicated by arrows 114) throughout a room. In this regard, indoor fan 42 is generally configured for drawing in air 114 through intake vent 110 and urging the flow of air through indoor heat exchanger 40 before discharging the air 114 out of discharge vent 112. According to the illustrated embodiment, intake vent 110 is positioned proximate a bottom of unit 10 and discharge vent 112 is positioned proximate a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of air 114 before discharging it back into the room. Specifically, during a cooling operation, controller 64 may be provided with a target temperature, e.g., as set by a user for the desired room temperature. In general, components of refrigeration loop 48, outdoor fan 32, indoor fan 42, and other components of unit 10 operate to continuously cool the flow of air.

In order to facilitate operation of refrigeration loop 48 and other components of unit 10, unit 10 may include a variety of sensors for detecting conditions internal and external to the unit 10. These conditions can be fed to controller 64 which may make decisions regarding operation of unit 10 to rectify undesirable conditions or to otherwise condition the flow of air 114 into the room. For example, as best illustrated in FIG. 7, unit 10 may include an indoor temperature sensor 120 which is positioned and configured for measuring the indoor temperature within the room. In addition, unit 10 may include an indoor humidity sensor 122 which is positioned and configured for measuring the indoor humidity within the room. In this manner, unit 10 may be used to regulate the flow of air 114 into the room until the measured indoor temperature reaches the desired target temperature and/or humidity level. According to exemplary embodiments, unit 10 may further include an outdoor temperature sensor for measuring ambient outdoor temperatures.

As used herein, "temperature sensor" or the equivalent is intended to refer to any suitable type of temperature measuring system or device positioned at any suitable location for measuring the desired temperature. Thus, for example, temperature sensor 120 may each be any suitable type of temperature sensor, such as a thermistor, a thermocouple, a resistance temperature detector, a semiconductor-based integrated circuit temperature sensor, etc. In addition, temperature sensor 120 may be positioned at any suitable location and may output a signal, such as a voltage, to a controller that is proportional to and/or indicative of the temperature being measured. Although exemplary positioning of temperature sensors is described herein, it should be appreciated that unit 10 may include any other suitable number, type, and position of temperature, and/or other sensors according to alternative embodiments.

As used herein, the terms "humidity sensor" or the equivalent may be intended to refer to any suitable type of humidity measuring system or device positioned at any suitable location for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may be positioned at any suitable location and may output a signal, such as a voltage, to a controller that is proportional to and/or indicative of the humidity being measured. Although exemplary positioning of humidity sensors is described herein, it should be appreciated that unit 10 may include any other suitable number, type, and position of humidity sensors according to alternative embodiments.

Now that the construction of air conditioner unit 10 and the configuration of controller 64 according to exemplary embodiments have been presented, an exemplary method 200 of operating a packaged terminal air conditioner unit will be described. Although the discussion below refers to the exemplary method 200 of operating air conditioner unit 10, one skilled in the art will appreciate that the exemplary method 200 is applicable to the operation of a variety of other air conditioning appliances. In exemplary embodiments, the various method steps as disclosed herein may be performed by controller 64 or a separate, dedicated controller.

In general, method 200 may be initiated upon receiving a command to initiate an operating cycle. For example, the command to initiate an operating cycle may come from a user of the air conditioner unit 10, may be initiated automatically by controller 64 when the difference between the measured room temperature and a target room temperature exceeds a predetermined threshold, or the operating cycle may be initiated in any other suitable manner and from any other suitable source. In general, the command to initiate the operating cycle may include a target compressor speed that may be determined by controller 64 based on a variety of factors, e.g., such as the sealed system demand, the indoor temperature, the outdoor temperature, the target room temperature, the measured room temperature, or any other suitable factors.

Figure 8:
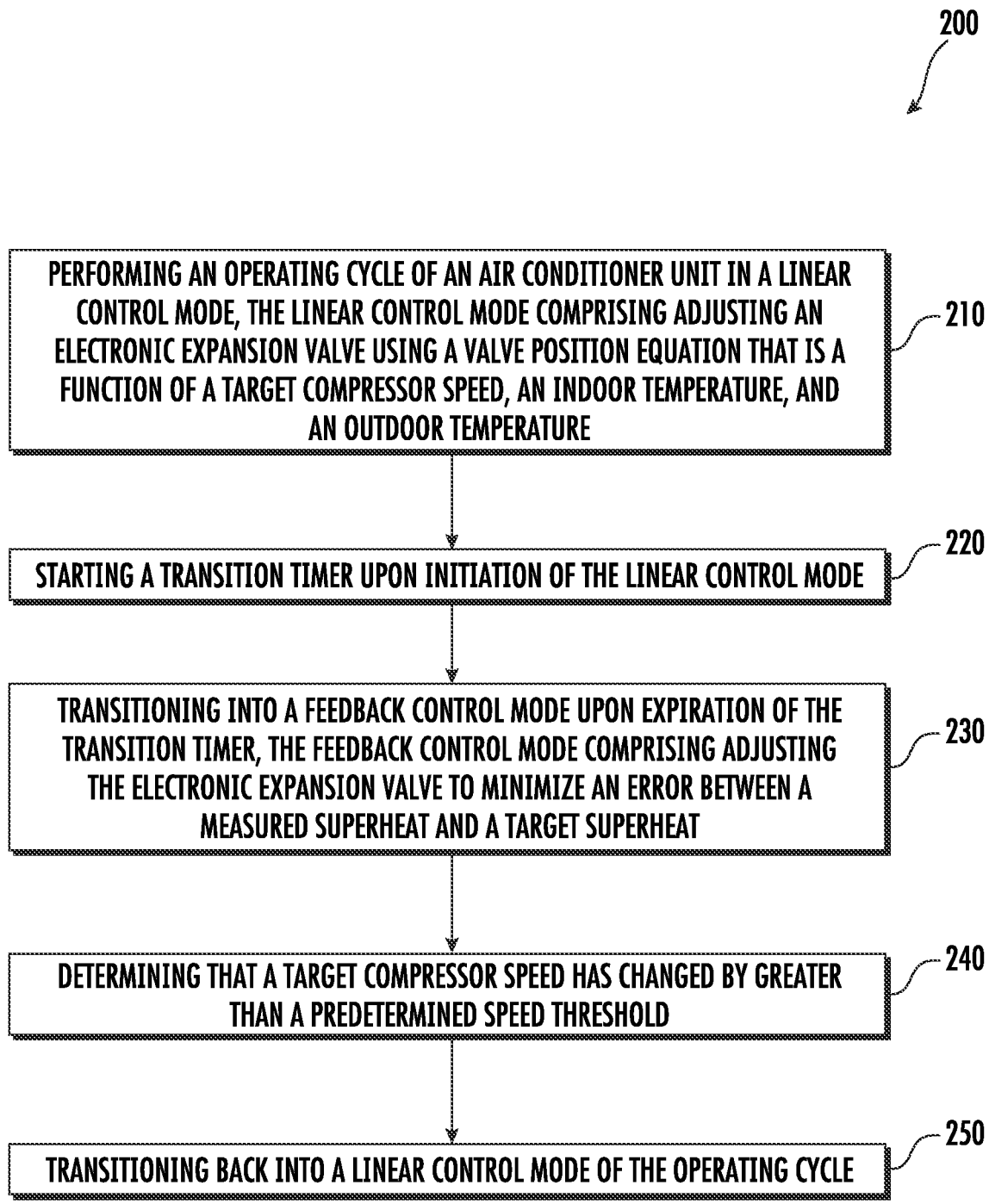
FIG. 8 illustrates a method for operating an air conditioner unit in accordance with one embodiment of the present disclosure.

Referring now to FIG. 8, method 200 includes, at step 210, performing an operating cycle of an air conditioner unit in a linear control mode. In this regard, for example, upon initiation of an operating cycle of air conditioner unit 10, it may be desirable to regulate the position of the electronic expansion valve (EEV 50) based on the compressor speed, a difference between the indoor and outdoor ambient temperatures, and empirically determined constants. In this manner, oscillations, inefficiencies, or other poor performance associated with a closed loop feedback control method may be avoided while the system is experiencing transient behavior, pressures are fluctuating, the compressor is starting up, etc.

Notably, after this transient period has ended, it may be desirable to transition to a closed loop feedback control system, e.g., using a proportional control algorithm, a proportional-integral ("PI") control algorithm, or a proportional-integral-derivative ("PID") control algorithm. Each of these control algorithms will be described below according to exemplary embodiments. However, it should be appreciated that these control algorithms may vary while remaining within the scope of the present subject matter.

In general, the linear control mode may include adjusting EEV 50 using a valve position equation that is a function of the target compressor speed, an indoor temperature, and an outdoor temperature. In addition, the methods described herein may rely on the use of empirically determined constants, e.g., constants determined for a particular unit or system configuration that generate desirable starting positions based on testing in the laboratory, the field, etc. These empirically determined constants may vary depending on the air conditioner unit or application.

According to an exemplary embodiment of the present subject matter, the empirically determined linear position, referred to herein as the EEV position or the target position of EEV 50 may be determined using the following equation:

$$\text{EEV Position} = A \cdot \omega_{Comp} + B \cdot (T_{Outdoor} - T_{Indoor}) + C$$

In the linear control mode valve position equation shown above, the EEV Position may generally refer to the target position of EEV 50. The variables A, B, and C are empirically determined constants, $\omega_{Comp}$ is the compressor speed; $T_{Outdoor}$ is the outdoor temperature, and $T_{Indoor}$ is the indoor temperature. As noted above, the empirically determined constants A, B, and C may be determined in any suitable manner and using any suitable testing procedures for any particular unit or system configuration. In addition, it should be appreciated that these empirically determined constants may vary depending on whether the air conditioner unit is operating in a heat pump mode (e.g., designated with subscript "HP") or an air conditioning mode (e.g., designated with subscript "AC"). Thus, A, B, and C may in practice include $A_{HP}$ or $A_{AC}$, $B_{HP}$ or $B_{AC}$, and $C_{HP}$ or $C_{AC}$, each of which may be swapped into the valve position equation described above depending on the operating mode.

Notably, as explained above, the valve position equation is used to identify the target position of EEV 50 based solely on the target compressor speed, the indoor temperature, the outer temperature, and empirically determined constants. However, electronic expansion valves commonly include a nonlinear response profile, such that the flow rate through the valve is not linearly proportional to the valve position. Accordingly, for example, a single step movement when the valve is almost closed may change the flow rate significantly more than a single step change when the valve is almost open, which would likely have minimal impact on the flow rate through the valve. In order to improve the tuning of the calculated target position of EEV 50, determining the target position of the EEV 50 may further include the use of a flow equation to compensate for this nonlinear response of the electronic expansion valve.

Specifically, according to exemplary embodiments, method 200 may include determining the target position of the electronic expansion valve and may include determining a target flow rate of refrigerant through the electronic expansion valve and calculating the target position of the electronic expansion valve based at least in part on the target flow rate. For example, determining the target flow rate may include calculating the target flow rate using a flow equation (e.g., which may have a similar form to the above-described valve position equation). This flow equation may also be a function of the target compressor speed, the indoor temperature, and the outdoor temperature. For example, the following equation may be used to determine the target flow rate:

$$\text{Flow Rate} = A \cdot \omega_{Comp} B \cdot (T_{Outdoor} - T_{Indoor}) + C$$

In the flow equation provided above, the Flow Rate may refer to the target flow rate, A, B, and C may be empirically determined constants (e.g., distinct from A, B, and C described above), $\omega_{Comp}$ is the target compressor speed, $T_{Outdoor}$ is the outdoor temperature, and T Indoor is the indoor temperature. Similar to the empirically determined constants described above, the empirically determined constants A, B, and C that are used in the flow equation may be determined in any suitable manner, using any suitable testing procedures, and for any particular unit or system configuration. In addition, it should be appreciated that the constants used in the flow equation may be different than the constants used in the valve position equation. These empirically determined constants may also vary depending on whether the air conditioner unit is operating in a heat pump mode (e.g., designated with subscript "HP") or an air conditioning mode (e.g., designated with subscript "AC"). Thus, A, B, and C may in practice include $A_{HP}$ or $A_{AC}$, $B_{HP}$ or $B_{AC}$, and $C_{HP}$ or $C_{AC}$, each of which may be swapped into the flow equation described above depending on the operating mode.

Once the desired or target flow rate through EEV 50 is calculated, calculating the target position based at least in part on the flow rate may include using a valve position equation that is a function of the target flow rate. For example, the valve position equation is provided below in the form of a quadratic equation. However, it should be appreciated that according to alternative embodiments, this valve position equation may take the form of a piecewise linear function, a logarithmic function, or any other suitable mathematical function or representation that relates valve flow rate to the valve position. According to exemplary embodiments, the following valve position equation may be used, wherein D, E, and F are empirically determined constants:

$$\text{EEV Position} = D \cdot \text{Flow Rate}^2 + E \cdot \text{Flow Rate} + F$$

Similar to the empirically determined constants described above, the empirically determined constants D, E, and F that are used in the valve position equation may be determined in any suitable manner, using any suitable testing procedures, and for any particular electronic expansion valve or valve configuration. In addition, it should be appreciated that the constants used in the flow equation may be different than the constants described above.

In general, the target position of the electronic expansion valve determined using the linear control mode may be an ideal or best initial guess for the valve position that generates improved system performance and reliability under varying conditions (e.g., such as varying compressor speeds and indoor/outdoor temperature differentials). However, as the target superheat approaches the measured superheat, a closed-loop feedback control process may perform better during this steady-state operation than the linear control mode. In this regard, for example, by using a PI or PID control algorithm, the integral term may ensure that steady-state errors are minimized.

Accordingly, step 220 may include starting a transition timer upon initiation of the linear control mode and step 230 may include transitioning into a feedback control mode upon expiration of the transition timer. Although the transition trigger is described herein as being time-based, e.g., by a predetermined transition time period, it should be appreciated that other transition triggers are possible and within the scope of the present subject matter. For example, the transition trigger may be related to the target room temperature, a temperature differential between the room temperature and a setpoint, etc.

In general, the feedback control mode may include adjusting the EEV 50 to minimize the error between a measured superheat and a target superheat. For example, the feedback control mode may include implementation of a feedback control algorithm (e.g., a PI controller) as follows, where $K_p$, $K_i$ are controller gains and $e_{SH}(t)$ is an error term equal to the target superheat minus the measured superheat:

$$\text{EEV}_{Target} = K_p \cdot e_{SH}(t) + K_i \int e_{SH}(t) dt$$

Notably, as explained briefly above, transitioning from the linear control mode to the feedback control mode may result in dangerous or inefficient transient conditions. For example, if the control term of a PI controller is the current valve position, the EEV position may sharply increase in cause oscillations that may be difficult to control. If the actual term is initialized to zero, the EEV 50 may close and create a sharp spike in system pressures which may cause the compressor to stall. Accordingly, aspects the present subject matter are further directed to the initialization or seeding of the control term in the PI controller for improved system performance, efficiency, and safety.

Specifically, according to an exemplary embodiment, the integral term of the PI controller maybe set such that the old EEV the position (e.g., the final EEV position from the linear control mode) is equal to the new target EEV be positioned (e.g., the initial position output from the PI controller). Accordingly, according to aspects of the present subject matter, the integral term of the feedback control algorithm is initiated using the following equation, where $EEV_{Linear}$ is a valve position at transition from the linear control mode:

$$\int e_{SH}(t)dt = \frac{(EEV_{Linear} - K_p \cdot e_{SH}(t))}{K_i}$$

As explained briefly above, the PI controller or the closed-loop feedback control mode may be suitable for maintaining the EEV position such that the measured superheat approximates the target superheat. However, upon large changes in system demand, such as when a user suddenly requests that the room be heated or cooled, use of the closed-loop feedback system may result in diverging behavior. Accordingly, method 200 may further include steps for returning back to the linear control mode in the event operation under that mode would be more advantageous, stable, efficient, and safe for conditioner unit 10.

In this regard, step 240 may generally include determining that a target compressor speed has changed by greater than a predetermined threshold and step 250 may include transitioning back into a linear control mode of the operator cycle when that large compressor speed change is detected. In general, the compressor speed change is substantially instantaneous, e.g., such as when a user requests that a room temperature be elevated by a predetermined amount and the target compressor speed changes as a step function. For example, such a request may cause the compressor to change speeds by more than 250, more than 500, more than 750, more than 1000, or more revolutions per minute. Accordingly, the predetermined speed threshold may be between about 250 and 1500 revolutions per minute, between about 500 and 1000 revolutions per minute, or about 750 revolutions per minute. When such a speed change is detected, the linear control mode may be utilized for improved system performance. In general, the operating cycle may transition back and forth between the linear control mode and the feedback control mode as described herein for improved system performance and reliability.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using unit 10 as an example, it should be appreciated that this method may be applied to operate any suitable air conditioner unit.

As explained above, aspects of the present subject matter are generally directed to an air conditioner unit having an electronic expansion valve (EEV) and methods for controlling the same. Generally, during stable operating conditions, the EEV is controlled using a closed loop control (e.g., a PI controller) to regulate refrigerant flow to maintain a superheat temperature difference. However, when a compressor speed suddenly changes, the PI superheat control may result in divergent behavior or harmful oscillations. Accordingly, aspects of the present subject matter compensate for large compressor speed changes by resetting the EEV control mode from feedback control (e.g., PI or PID control) to the linear positioning mode (e.g., EEV position based on valve position equation with empirically determined constants) when a compressor speed change exceeds a maximum value. A transition timer may be restarted and the EEV control may transition back into the feedback control when the timer expires.

In addition, when the EEV control mode changes to feedback control, improper initialization of the position error in the PI/PID control algorithm may result in instability due to the lag in response of the sealed system and the sharp change in EEV position. Accordingly, aspects of the present subject matter are directed to improved methods of initializing the position error whenever control switches from the linear position control mode to the PI/PID control mode. Specifically, an algorithmic approach may be used to seed the feedback control algorithm with an integral term that reduces undesirable transients or divergence when the EEV control mode transitions from linear control to feedback control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air conditioner unit, the air conditioner unit comprising a refrigeration loop comprising an indoor heat exchanger and an outdoor heat exchanger, a compressor operably coupled to the refrigeration loop and being configured to urge refrigerant through the refrigeration loop, and an electronic expansion valve fluidly coupled to the refrigeration loop, the method comprising:
    performing an operating cycle in a feedback control mode, the feedback control mode comprising adjusting the electronic expansion valve to minimize an error between a measured superheat and a target superheat;
    determining that a target compressor speed has changed by greater than a predetermined speed threshold; and
    initiating a linear control mode of the operating cycle in response to determining that the target compressor speed has changed by greater than the predetermined speed threshold, the linear control mode comprising adjusting the electronic expansion valve using a valve position equation that is a function of the target compressor speed, an indoor temperature, and an outdoor temperature.

2. The method of claim 1, wherein the predetermined speed threshold is between about 500 and 1000 revolutions per minute.

3. The method of claim 1, further comprising:
starting a transition timer upon initiation of the linear control mode; and
transitioning back into the feedback control mode upon expiration of the transition timer.

4. The method of claim 1, wherein the feedback control mode comprises implementation of a proportional, a proportional-integral, or a proportional-integral-derivative control algorithm.

5. The method of claim 1, wherein the feedback control mode comprises implementation of a feedback control algorithm as follows:

$$EEV_{Target} = K_p \cdot e_{SH}(t) + K_i \cdot \int e_{SH}(t)dt$$

where: $EEV_{Target}$ is a target position of the electronic expansion valve;
$K_p$, $K_i$ are controller gains; and
$e_{SH}$ (t) is an error term equal to the target superheat minus the measured superheat.

6. The method of claim 5, wherein an integral term of the feedback control algorithm is initiated using the following equation:

$$\int e_{SH}(t)dt = \frac{(EEV_{Linear} - K_p \cdot e_{SH}(t))}{K_i}$$

where: $EEV_{Linear}$ is a valve position at transition from the linear control mode.

7. The method of claim 1, wherein the target compressor speed is selected based on at least one of the indoor temperature, the outdoor temperature, or a target room temperature.

8. The method of claim 1, wherein the linear control mode comprises implementation of a control algorithm as follows:

$$EEV\ Position = A \cdot \omega_{Comp} + B \cdot (T_{Outdoor} - T_{Indoor}) + C$$

where: EEV Position is a valve position;
A, B, and C are empirically determined constants;
$\omega_{Comp}$ is the target compressor speed;
$T_{Outdoor}$ is the outdoor temperature; and
$T_{Indoor}$ is the indoor temperature.

9. An air conditioner unit comprising:
a refrigeration loop comprising an indoor heat exchanger and an outdoor heat exchanger;
a compressor operably coupled to the refrigeration loop and being configured to urge refrigerant through the refrigeration loop;
an electronic expansion valve fluidly coupled to the refrigeration loop; and
a controller operably coupled to the compressor and the electronic expansion valve, the controller being configured to:
perform an operating cycle in a feedback control mode, the feedback control mode comprising adjusting the electronic expansion valve to minimize an error between a measured superheat and a target superheat;
determine that a target compressor speed has changed by greater than a predetermined speed threshold;
initiate a linear control mode of the operating cycle, the linear control mode comprising adjusting the electronic expansion valve using a valve position equation that is a function of the target compressor speed, an indoor temperature, and an outdoor temperature;
start a transition timer upon initiation of the linear control mode; and
transition back into the feedback control mode upon expiration of the transition timer.

10. The air conditioner unit of claim 9, wherein the feedback control mode comprises implementation of a feedback control algorithm as follows:

$$EEV\ Position = A \cdot \omega_{Comp} + B \cdot (T_{Outdoor} - T_{Indoor}) + C$$

where: $EEV_{Target}$ is a target position of the electronic expansion valve;
$K_p$, $K_i$ are controller gains; and
$e_{SH}$ (t) is an error term equal to the target superheat minus the measured superheat.

11. The air conditioner unit of claim 10, wherein an integral term of the feedback control algorithm is initiated using the following equation:

$$\int e_{SH}(t)dt = \frac{(EEV_{Linear} - K_p \cdot e_{SH}(t))}{K_i}$$

where: $EEV_{Linear}$ is a valve position at transition from the linear control mode.

12. The air conditioner unit of claim 9, wherein the linear control mode comprises implementation of a control algorithm as follows:

$$EEV\ Position = A \cdot \omega_{Comp} + B \cdot (T_{Outdoor} - T_{Indoor}) + C$$

where: EEV Position is a valve position;
A, B, and C are empirically determined constants;
$\omega_{Comp}$ is the target compressor speed;
$T_{Outdoor}$ is the outdoor temperature; and
$T_{Indoor}$ is the indoor temperature.

13. The air conditioner unit of claim 9, wherein the air conditioner unit is a single-package vertical unit (SPVU) or a package terminal air conditioner (PTAC).

14. A method of operating an air conditioner unit, the air conditioner unit comprising a refrigeration loop comprising an indoor heat exchanger and an outdoor heat exchanger, a compressor operably coupled to the refrigeration loop and being configured to urge refrigerant through the refrigeration loop, and an electronic expansion valve fluidly coupled to the refrigeration loop, the method comprising:
performing an operating cycle in a linear control mode, the linear control mode comprising adjusting the electronic expansion valve using a valve position equation that is a function of a target compressor speed, an indoor temperature, and an outdoor temperature;
starting a transition timer upon initiation of the linear control mode; and
transitioning into a feedback control mode upon expiration of the transition timer, the feedback control mode comprising adjusting the electronic expansion valve to minimize an error between a measured superheat and a target superheat.

15. The method of claim 14, wherein the feedback control mode comprises implementation of a proportional, a proportional-integral, or a proportional-integral-derivative control algorithm.

16. The method of claim 14, wherein the feedback control mode comprises implementation of a feedback control algorithm as follows:

$$EEV_{Target} = K_p \cdot e_{SH}(t) + K_i \cdot \int e_{SH}(t)dt$$

where: $EEV_{Target}$ is a target position of the electronic expansion valve;
$K_p$, $K_i$ are controller gains; and $e_{SH}$ (t) is an error term equal to the target superheat minus the measured superheat.

17. The method of claim 16, wherein an integral term of the feedback control algorithm is initiated using the following equation:

$$\int e_{SH}(t)dt = \frac{(EEV_{Linear} - K_p \cdot e_{SH}(t))}{K_i}$$

where: $EEV_{Linear}$ is a valve position at transition from the linear control mode.

18. The method of claim 14, further comprising:
determining that the target compressor speed has changed by greater than a predetermined speed threshold; and
initiating the linear control mode of the operating cycle.

19. The method of claim 14, wherein the linear control mode comprises implementation of a control algorithm as follows:

$$EEV\ Position = A \cdot \omega_{Comp} + B \cdot (T_{Outdoor} - T_{Indoor}) + C$$

where: EEV Position is a valve position;
A, B, and C are empirically determined constants;
$\omega_{Comp}$ is the target compressor speed;
$T_{Outdoor}$ is the outdoor temperature; and
$T_{Indoor}$ is the indoor temperature.

* * * * *